Sept. 25, 1956     H. N. RENTON     2,764,235
WINDOWS
Filed Feb. 7, 1951     14 Sheets-Sheet 7
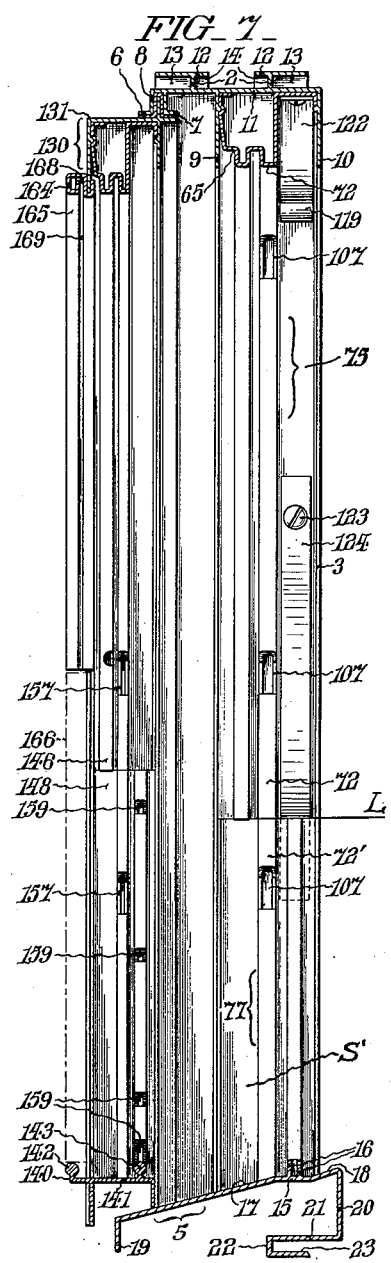
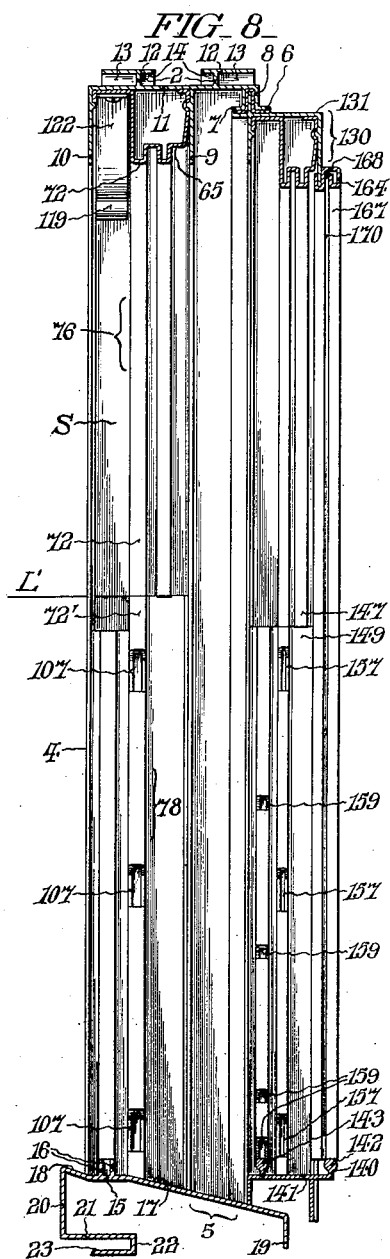
INVENTOR:
Henry N. Renton,
BY Paul & Paul
ATTORNEYS.

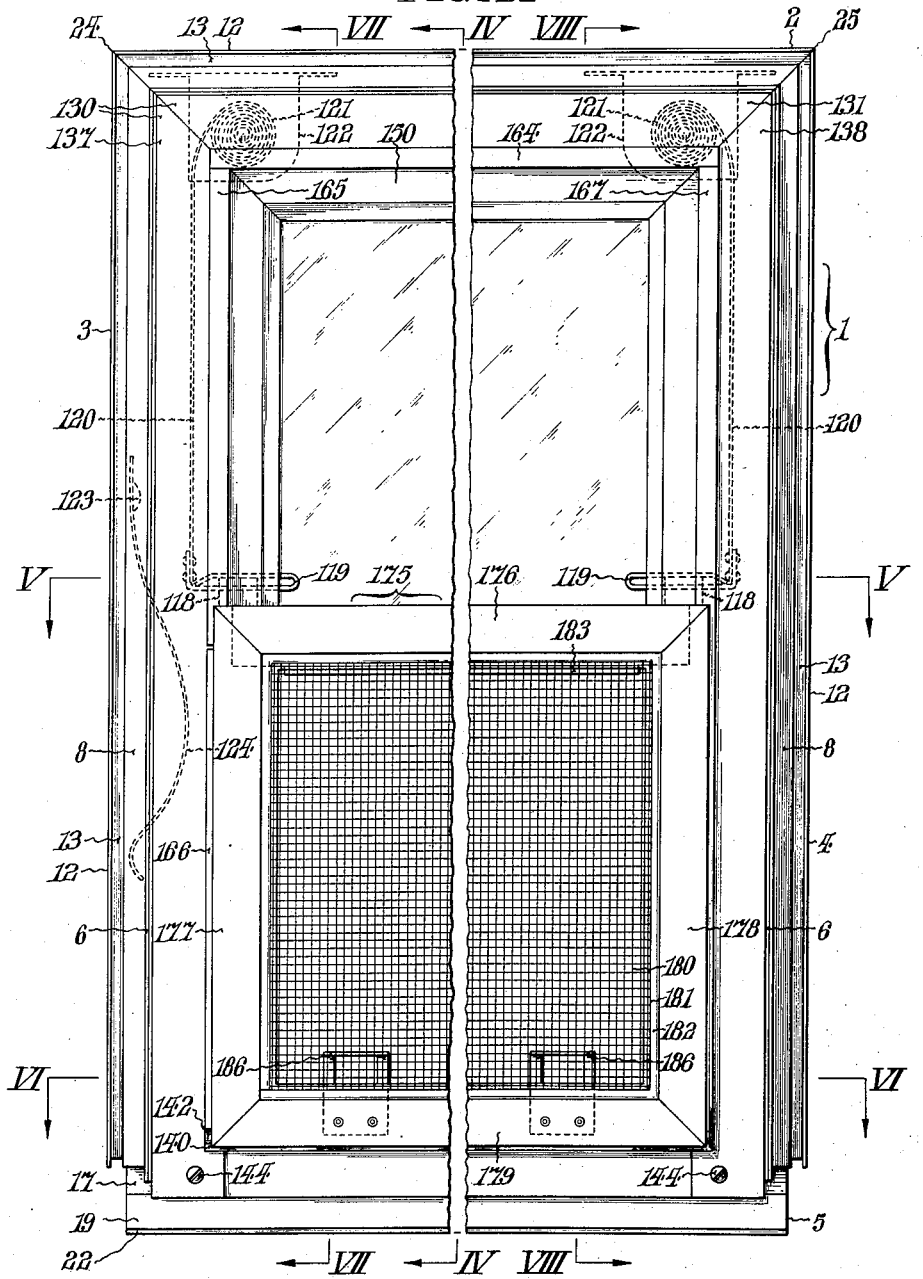

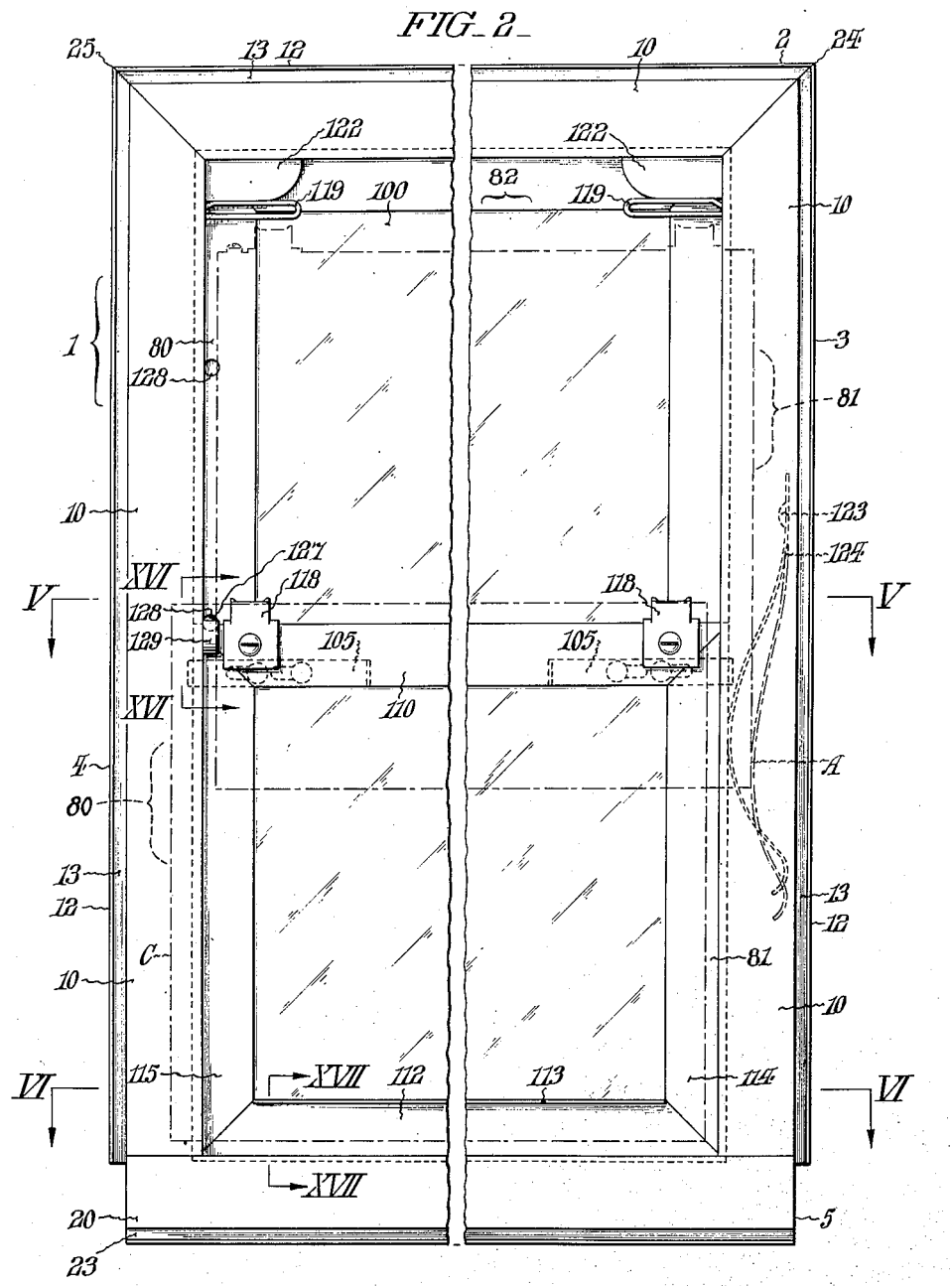

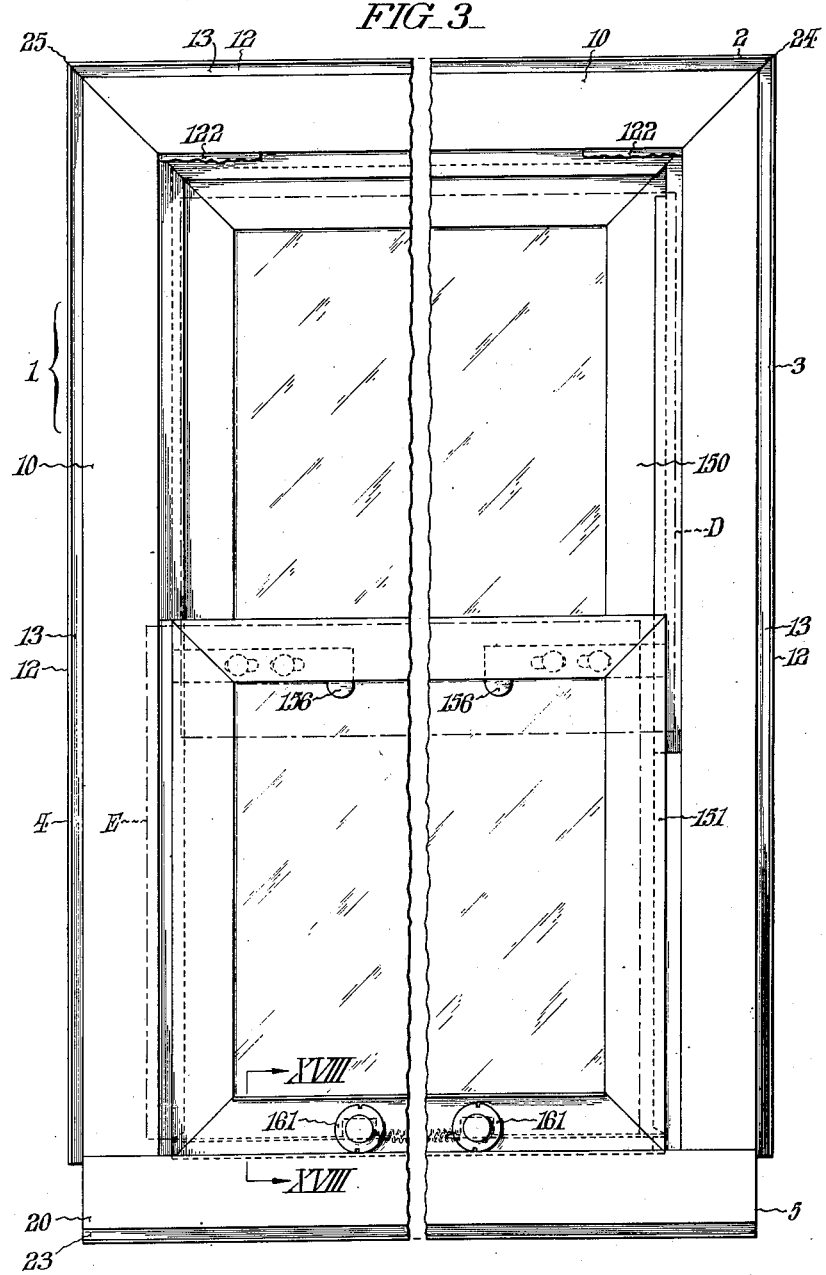

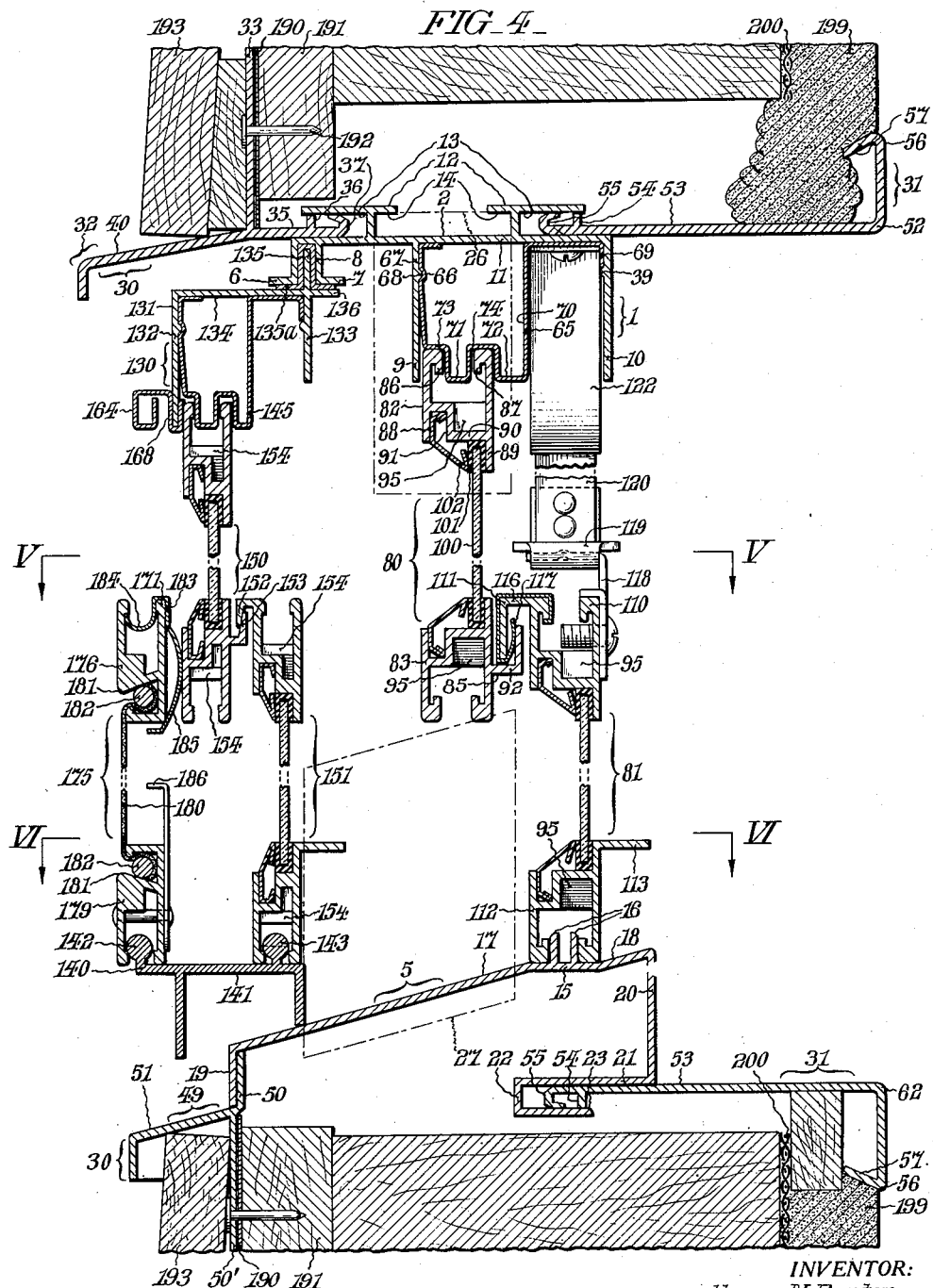

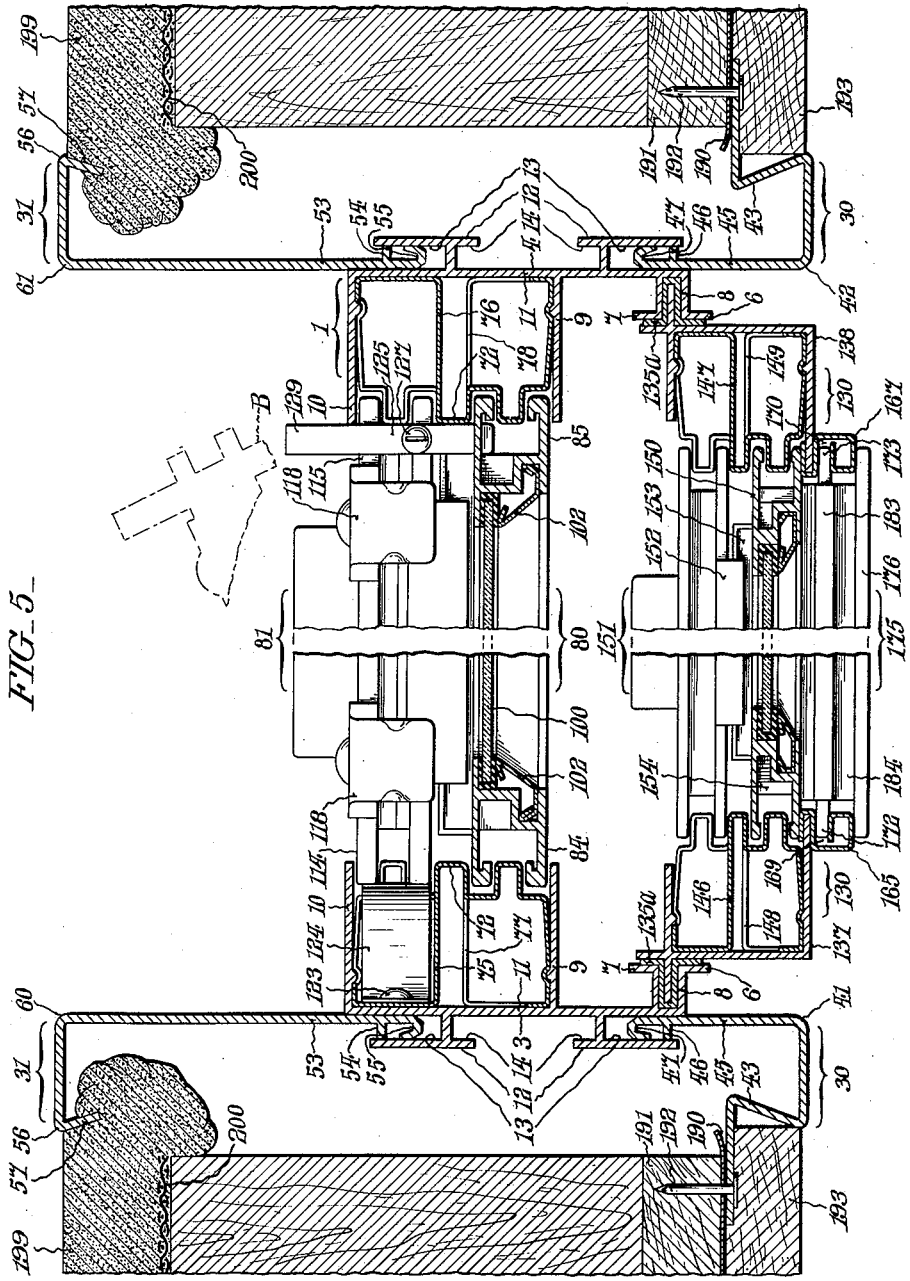

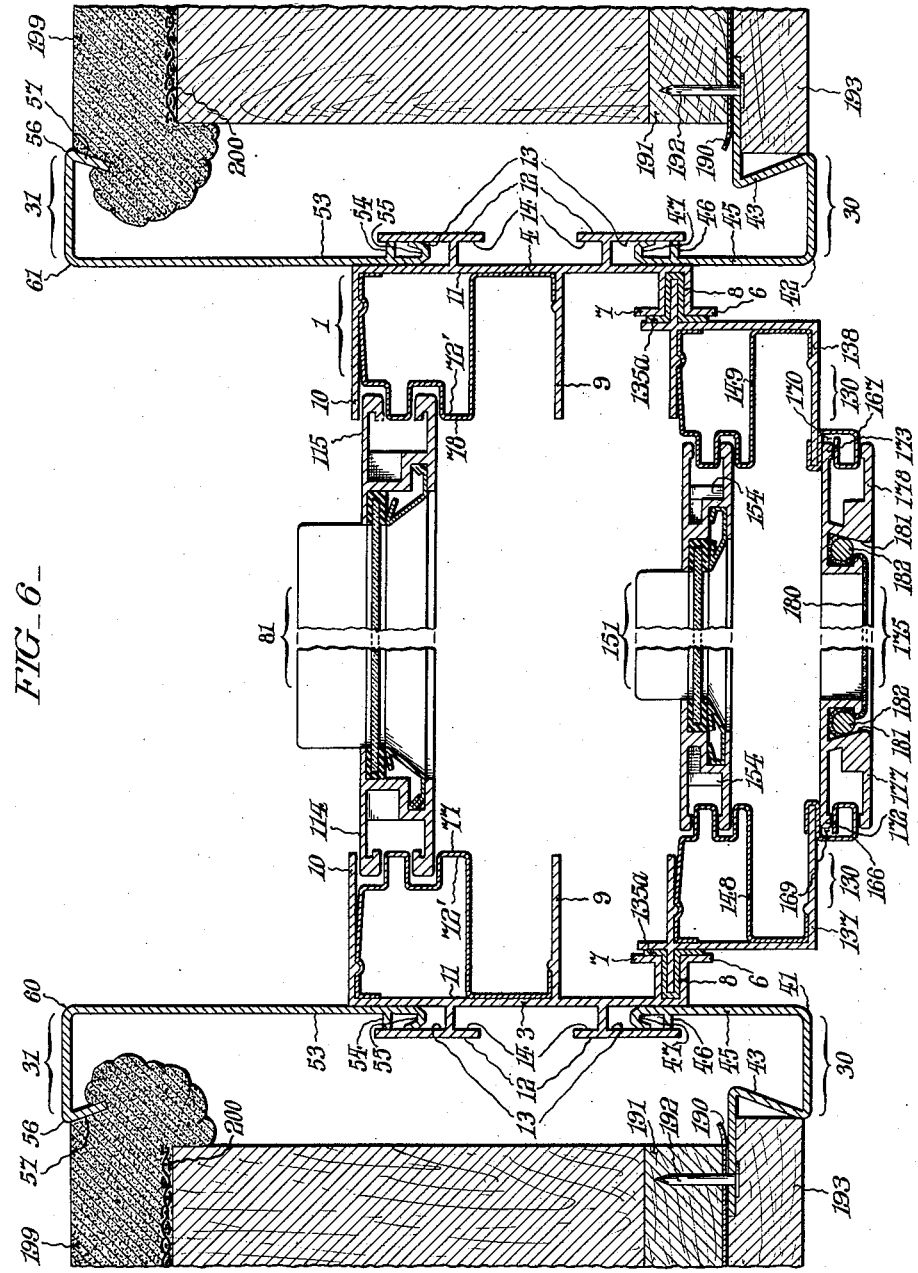

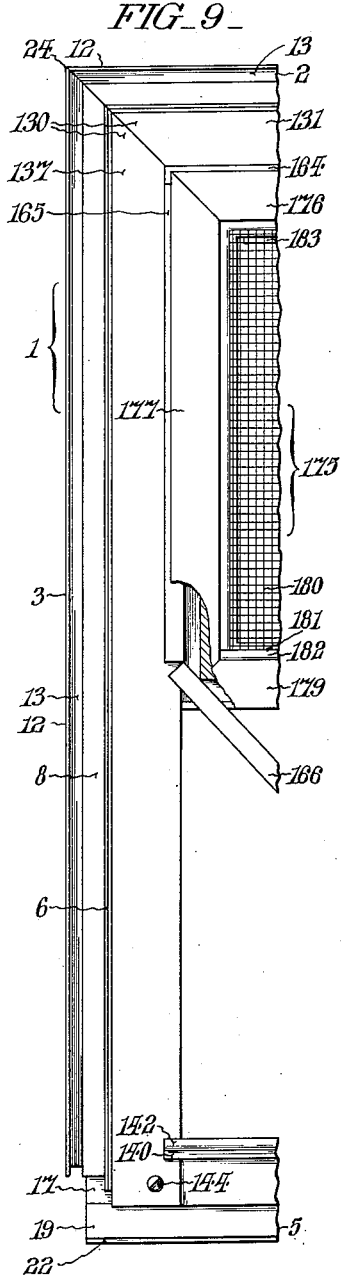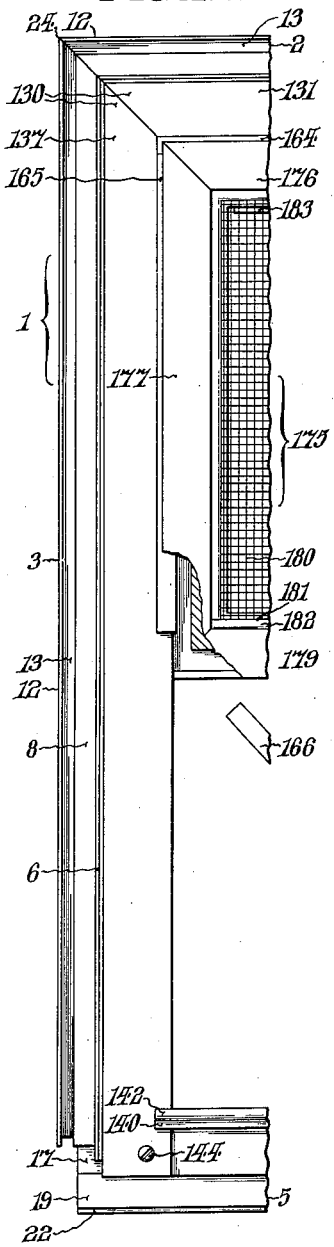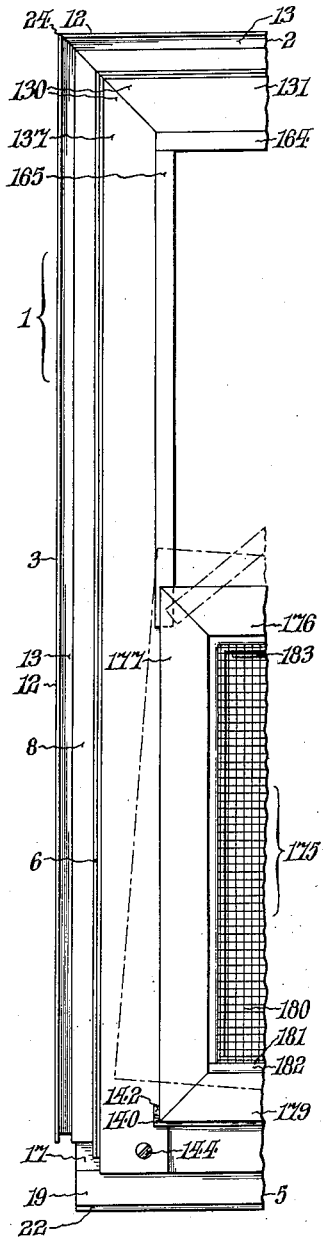

Sept. 25, 1956      H. N. RENTON      2,764,235
WINDOWS
Filed Feb. 7, 1951      14 Sheets-Sheet 9
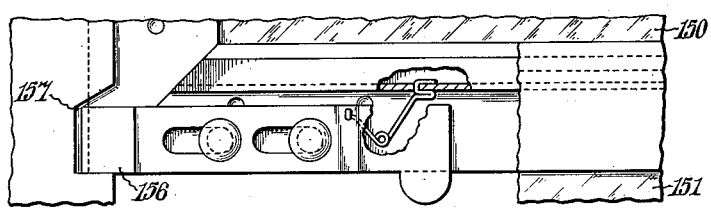
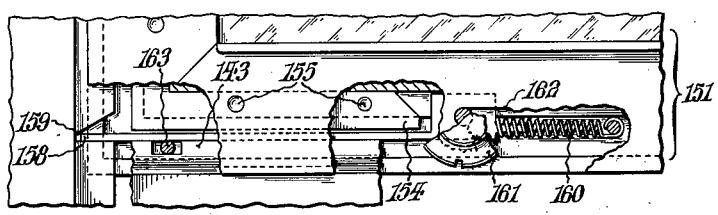
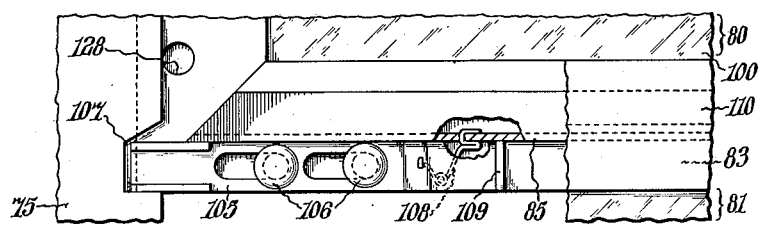
INVENTOR:
Henry N. Renton,
BY Paul & Paul
ATTORNEYS.

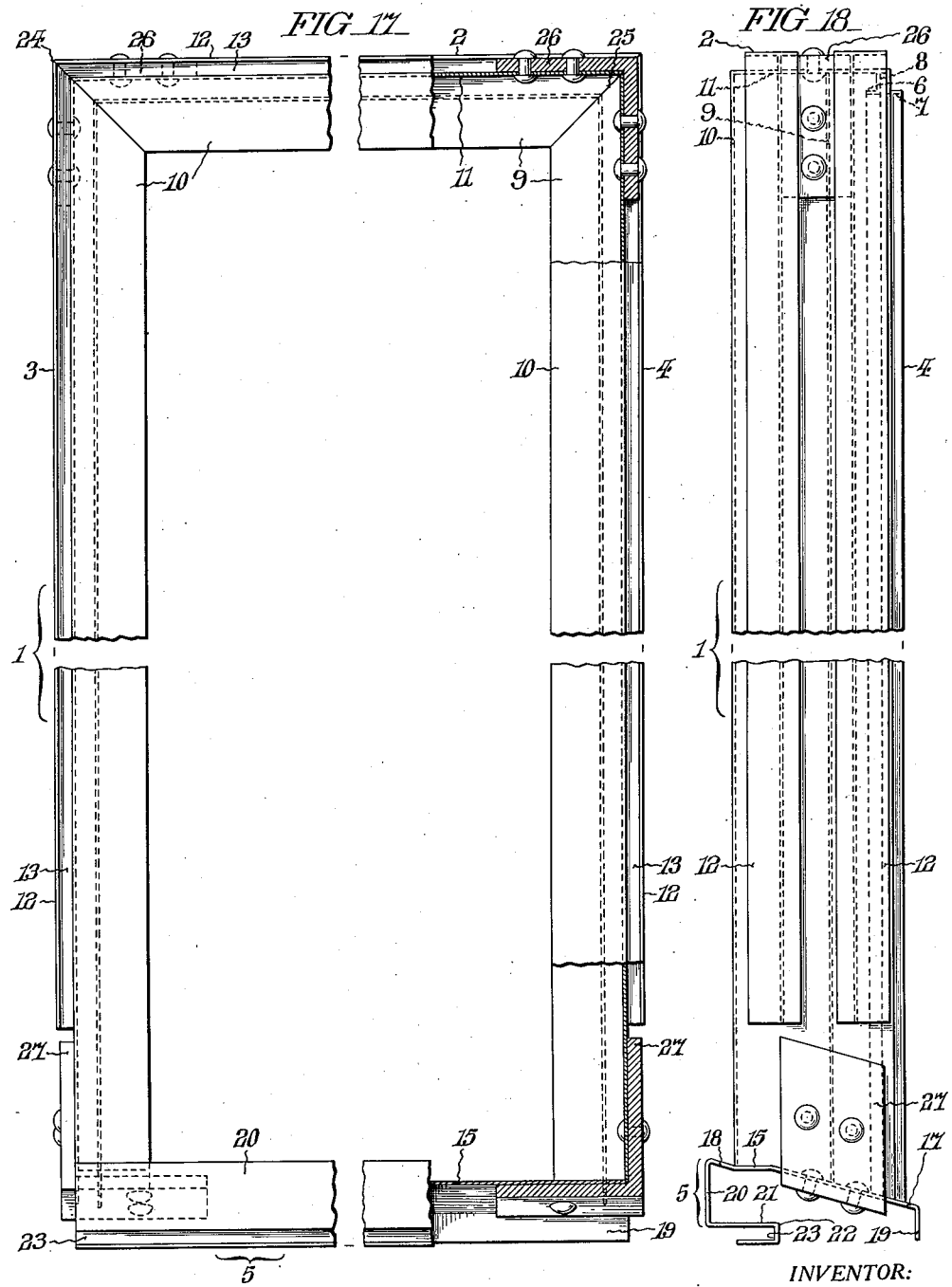

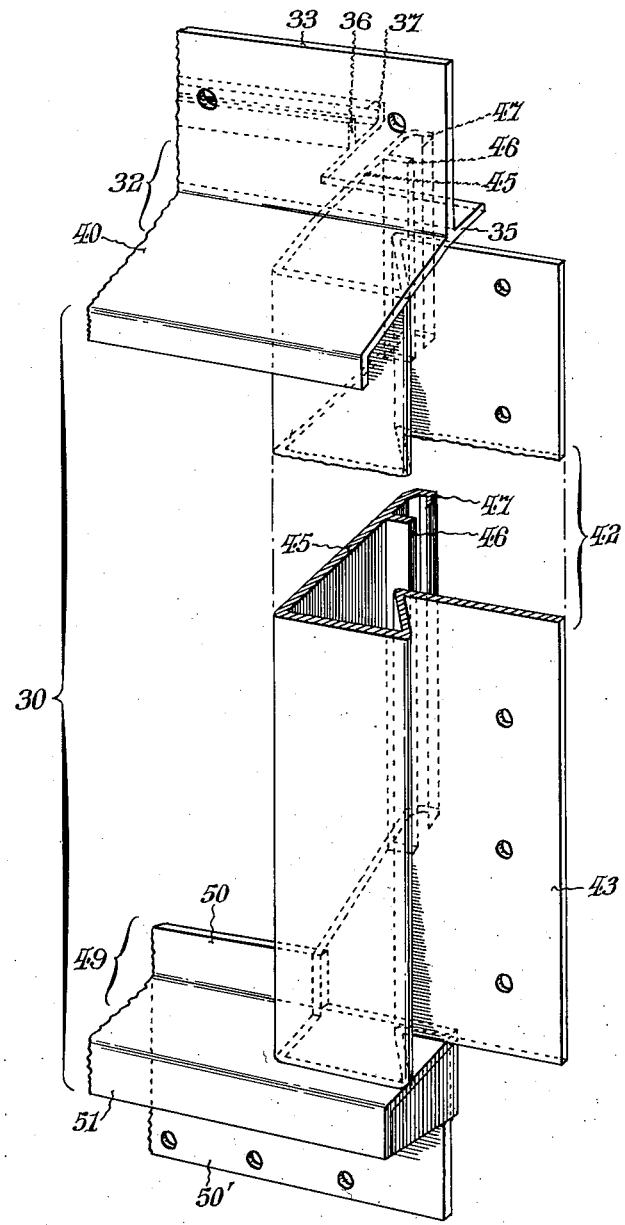

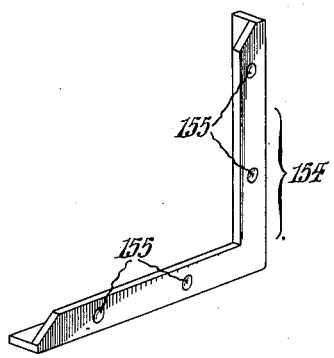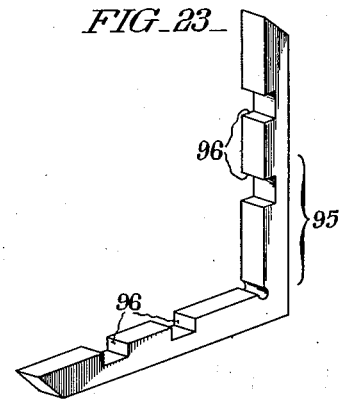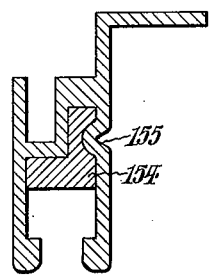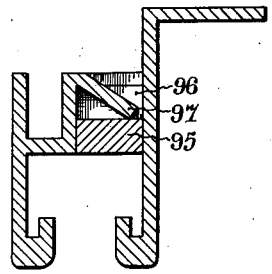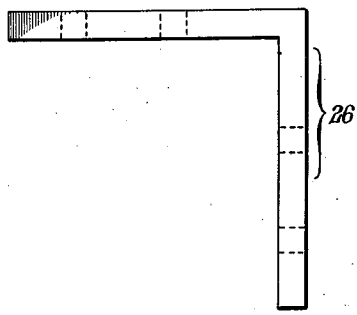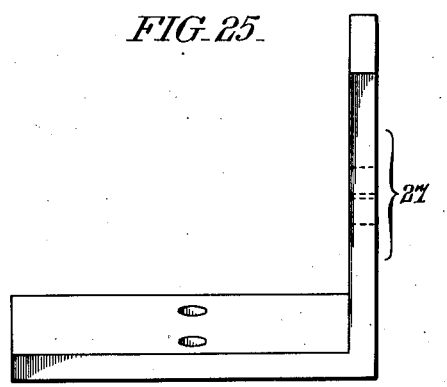

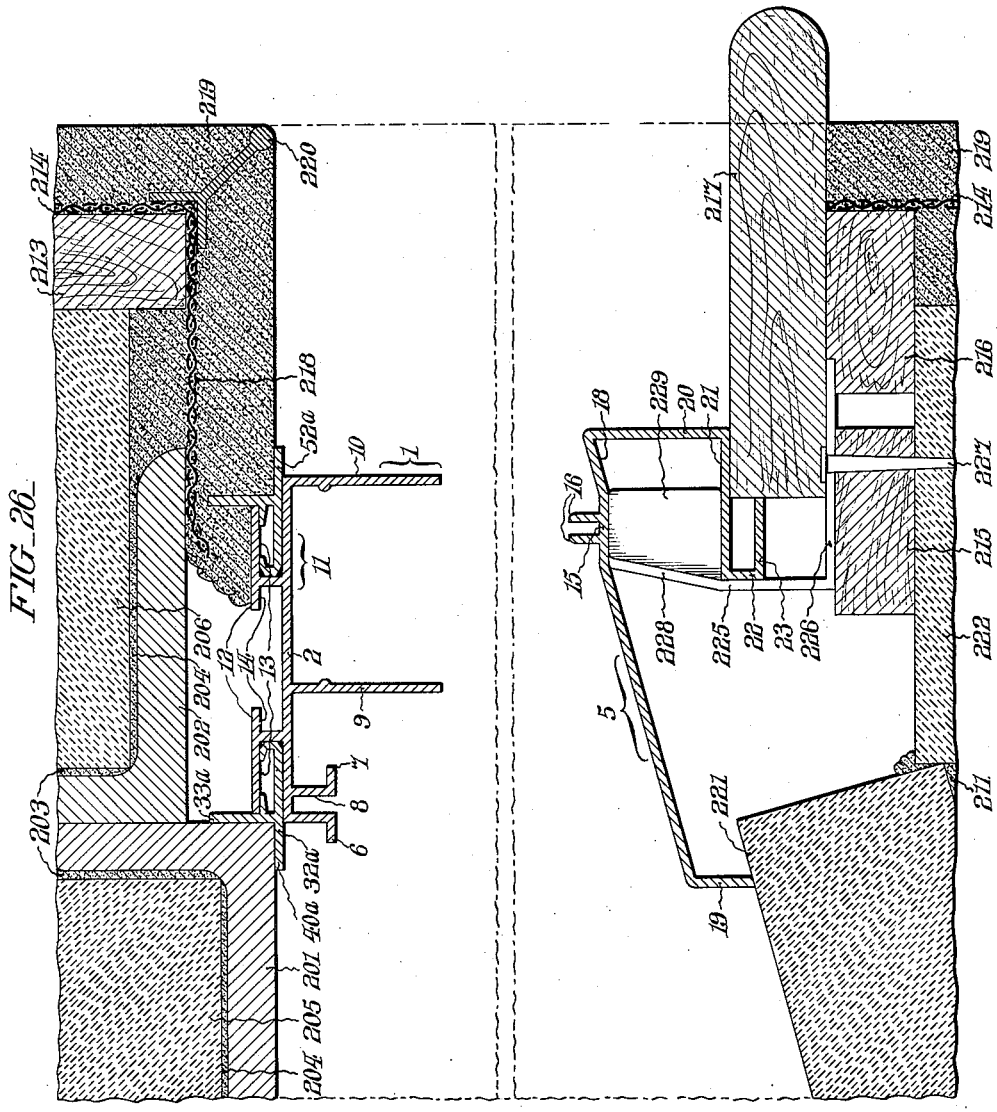

Sept. 25, 1956   H. N. RENTON   2,764,235
WINDOWS
Filed Feb. 7, 1951.   14 Sheets-Sheet 14
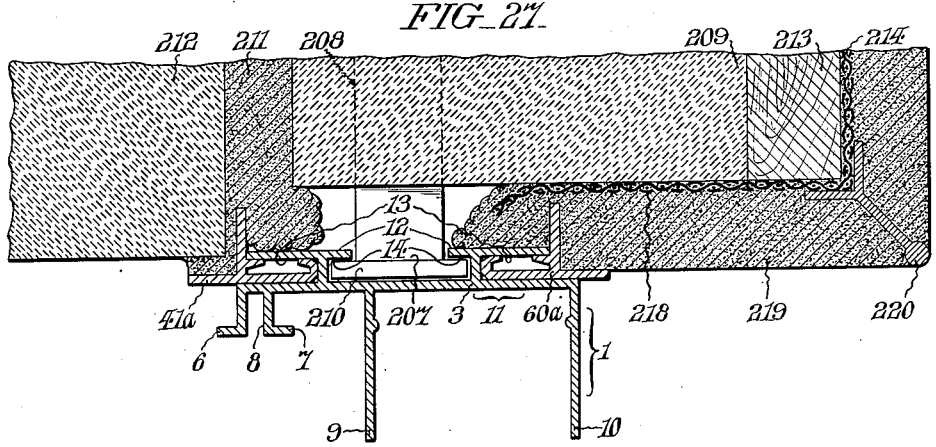
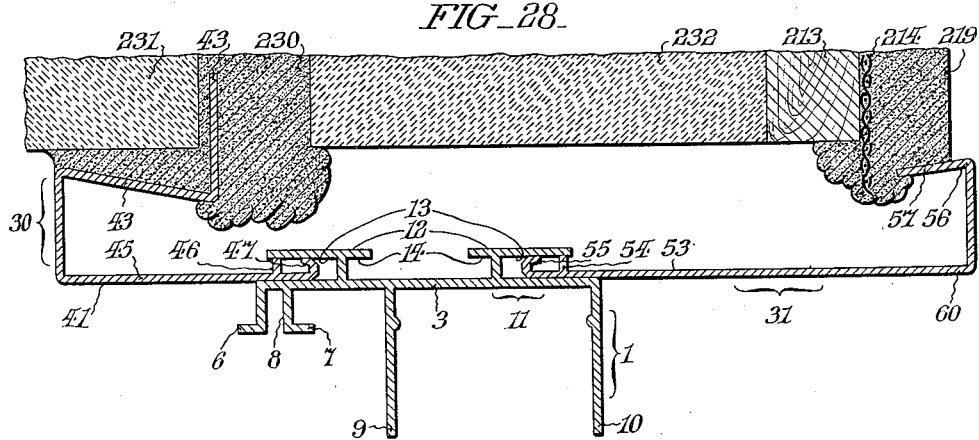
INVENTOR:
Henry N. Renton,
BY Paul & Paul
ATTORNEYS.

United States Patent Office 2,764,235
Patented Sept. 25, 1956

2,764,235

WINDOWS

Henry N. Renton, Philadelphia, Pa.

Application February 7, 1951, Serial No. 209,781

17 Claims. (Cl. 160—91)

This invention relates to windows, its principal aim being to provide a window structure in a form for permanent installation incident to erection of buildings, which is complete with sliding prime and storm sashes, and with a sliding screen sash for use during the summer months; and from which all of the sashes can all be easily removed from within doors for convenience of cleaning or inspection when necessary.

Another aim of my invention is to provide a window structure characterized as above which, although light in weight, is strong and rigid in all its parts, with its main frame and sash frames all fashioned from an extruded non-corrosive metal such as aluminum.

In connection with a window structure having the foregoing attributes, it is a further aim of my invention to provide for adjustment of the main frame to compensate for variations in the thicknesses of the building walls and thereby facilitate installation, with avoidance of leaky junctures through which wind or rain might seep, and with attainment of an attractive finish both exteriorly and interiorly of the building.

My invention is further concerned with structural improvements designed to prevent thermal transfer between the storm and prime sashes and thereby minimize moisture condensation at the inside of the window structure.

Other objects and attendant advantages will appear from the following description of the attached drawings, wherein Fig. 1 shows the outside elevation of a window structure conveniently embodying my invention.

Fig. 2 shows the inside elevation of the window.

Fig. 3 shows the inside elevation of the window with the prime sashes removed.

Fig. 4 is a vertical section of the complete window taken as indicated by the angled arrows IV—IV in Fig. 1, with the window set into the opening provided for it in a frame building.

Figs. 5 and 6 are horizontal sections taken as indicated by the angled arrows V—V and VI—VI respectively in Figs. 1, 2 and 4.

Figs. 7 and 8 are vertical sectional views taken as indicated by the angled arrows VII—VII and VIII—VIII in Fig. 1, with all of the sashes removed.

Figs. 9, 10 and 11 are fragmentary views corresponding to Fig. 1 and showing how the screen sash is removed.

Figs. 12 and 13 are fragmentary broken out detail views showing latch means provided for locking the upper and lower storm sashes.

Figs. 14 and 15 are similar views respectively showing latch means provided for the prime upper sash, and grasp and lock means provided for the prime lower sash of the window.

Fig. 16 is a fragmentary view partly in elevation and partly in section, taken as indicated by the angled arrows XVI—XVI in Figs. 2 and 15.

Fig. 17 is a broken out view in rear elevation of the main prime sash carrying frame of the window with portions shown in section to expose important structural details.

Fig. 18 is a vertical edge view of the main frame.

Fig. 19 is a fragmentary broken out perspective view of a finishing or trim frame forming a part of the window structure.

Figs. 20 and 21 are detail views showing cross sections of the bottom bars respectively of the lower prime and storm sashes.

Figs. 22, 23, 24 and 25 show various angle connectors used in the construction of the window.

Figs. 26 and 27 are views in vertical and horizontal section respectively like Figs. 4 and 5 showing the window structure set into a wall of masonry.

Fig. 28 is a view in cross section corresponding to Fig. 27 and showing a modification.

As herein delineated, my improved window structure comprises a main frame 1 with a lintel rail 2, jamb rails 3 and 4, and a sill rail 5, all formed from extruded metal. The lintel rail 2 and the jamb rails 3, 4 are identical in cross section, each of them having, adjacent its frontal edge, a pair of inwardly-directed spaced opposingly-arranged L-section flanges 6 and 7 which define a narrow longitudinally-extending groove 8 and adjacent its rear edge, a pair of straight inwardly-directed laterally spaced flanges 9 and 10 which define a relatively wide longitudinally-extending channel 11. In addition, each rail 2, 3, 4 is formed, adjacent its front and rear edges, with laterally-spaced outwardly-projecting T flanges 12 which define forwardly and rearwardly-open longitudinal grooves 13 and 14. The sill rail 5 of the main frame 1 is hollow in cross section and open at the bottom, its top having a relatively narrow horizontal portion 15 with a pair of spaced upstanding longitudinal ribs 16 between a wide downward rain-shedding frontal slope 17 and a similarly narrow rear portion 18, the wide slope terminating in a downwardly-directed edge flange 19. The rear web 20 of sill rail 5 is vertical and terminates in an inwardly-directed horizontal flange 21 which is retroverted as at 22 to define a rearwardly-open longitudinal groove 23. The lintel 2 and jamb rails 3 and 4 meet in miter joints as at 24 and 25 in Figs. 1–3, and are rigidly connected at these regions by angle pieces 26, whereof one is separately illustrated in Fig. 24, of which the legs are riveted in place in the intervals between the T flanges 11, 12 to the main webs of said rails as instanced in Figs. 4, 17 and 18. The lower ends of the jamb rails 3, 4 are cut crosswise, as at 17, on an angle corresponding to the slope of the sill 5 so as to bear fully upon the latter as shown in Figs. 4, 7, 8, 18 and 19, and are rigidly united to said sill by corner angle pieces 27, such as the one as separately illustrated in Fig. 25, whereof the legs are secured, likewise by means of rivets, to the base webs of said jamb rails and sill.

Associated with the main frame 1 are outer and inner trim frames which are comprehensively designated 30 and 31 respectively, and which serve to finish off the window exteriorly and interiorly of the building. The top rail 32 of the external trim frame 30 is of inverted T cross section as shown in Figs. 4 and 19, the upright longitudinal flange 33 thereof being plain, and the lateral flange 35 thereof being formed with spaced upstanding ridges 36 and 37 to engage with a snug fit into the laterally open groove 13 of the lintel rail 2 of main frame 1. The top rail 32 of the exterior trim frame 30 is moreover provided with a lateral flange 40 which projects outwardly beyond the window, and which is sloped downwardly somewhat to shed rain. The side rails 41, 42 of the exterior trim frame 30 have lateral flanges 43 which are Z shaped in cross section as shown in Figs. 5, 6 and 19, the inward flanges 45 thereof being formed with ridges 46 and 47 to engage snugly into the outwardly-open slots 13 of the jamb rails 3 and 4 of the main frame. The bottom rail 49 of the exterior trim frame 30, see Figs. 4 and 19, has upstanding and pendent flanges 50 and 50′ of which the former is inwardly offset and overlapped by the pendent portion 19 of the sill rail 5 of main frame 1, and an outward lateral flange 51 which is sloped to correspond with the main sill slope 17, for rain shedding purposes.

The top rail 52 of the interior trim frame 31, see Fig. 4, has a principal flange 53 with upstanding longitudinal ridges 54 and 55 at its distal end to fit snugly into the rearwardly open groove 13 of lintel rail 2 of main frame 1, and a perpendicular flange 56 whereof a relatively narrow edge margin is reversely directed as at 57. The side rails 60, 61 and the bottom rail 62 of the interior trim frame 31 have a cross section exactly like that of the top rail 52 as will be seen from Figs. 5, 6 and 28, the flanges 53 thereof being engaged in the lateral grooves 13 and 23 respectively of the jamb and sill rails 3, 4 and 5 of main frame 1 as shown in Figs. 4, 5, 6 and 28. It is to be understood that the component rails of interior trim frame 31 all meet in miter joints at corners.

Sprung into the channel 11 of the lintel rail 2 of main frame 1 as shown in Fig. 4, is an auxiliary strip 65 which is fashioned to angular S-shaped cross section from sheet metal, the same being anchored through lateral engagement of a longitudinal indentation 66 in one side flange 67 thereof with a longitudinal bead 68 on the flange 9 of the lintel rail, and through engagement of the terminal edge of the other side flange 69 thereof behind a longitudinal bead 39 on the flange 10 of said lintel rail. The web 70 of strip 65 is corrugated to provide parallel longitudinal box ridges 71, 72 and recesses 73, 74 for a purpose later on explained. Similar auxiliary jamb strips 75, 76 are lodged in the same manner in the upper portions of the channels of the jamb rails 3 and 4 of main frame 1 as shown in Figs. 5, 7, 8, said strips meeting with the auxiliary strip 65 in the lintel rail 2 in miter abutment as shown in Figs. 7 and 8. From Fig. 7 it will be observed that the auxiliary jamb strip 75 extends down to a level L well below the mid height of the window, and from Fig. 8 that the auxiliary jamb strip 76 extends down to a level L′ somewhat above the mid height of the window. The reason for this proportioning will also be explained later. The lower portions of the channels in the jamb rails 3, 4 of main frame 1 are occupied by auxiliary strip sections 77, 78 of different lengths which, like the strips 65, 75 and 76 but 77, 78 are reversed in position as shown in Figs. 5, 6, 7, 8, with their ends in square abutment. With the auxiliary jamb strips positioned as just explained, it will be seen that the box ridges 72 and 72′ are in exact alignment to serve as sash parting beads.

The prime upper and lower sashes of the window are comprehensively designated 80 and 81 respectively. As best illustrated in Figs. 2, 4 and 5 the top, bottom and side rails 82, 83, 84 and 85 of sash 80 are all of extruded metal and of irregular U-shaped cross sections, with their longitudinal flanges 86, 87 extended inwardly of the sash somewhat as at 88, 89, and their transverse webs 90 stepped to provide a continuous perimetric groove 91 internally of the completed frame, the bottom bar differing only in that it has an upwardly-open longitudinal L-shaped flange 92 at the back thereof. The several bars of the sash 80 meet in miter joints at the frame corners at which they are rigidly united by angle pieces 95 (such as the one separately illustrated in perspective in Fig. 23). The legs of each angle piece 95 are of a width to fit snugly into the spaces between the side flanges of contiguous rails at the outer sides, and said legs have notches 96 at intervals lengthwise of their inner surfaces. In assembling the bars to form the sash frame, tabs 97 of their cross webs are lanced into the notches 96 in the legs of the angle pieces 95, as seen in Fig. 20, the width of said tabs being exactly equal to the width of said notches. In this way the sash frame bars are permanently rigidly united without necessitating the use of rivets, screws or other special securing devices, and without marring of their exterior surfaces, the angle pieces being entirely concealed from view when the sash is in position in the window. The glass pane 100 for the upper main sash 80 is edged with compressible sealing tape 101, and maintained in firm weather-tight engagement with the inwardly extended portions of the posterior flanges of the frame bars, by removable spring strips 102 snapped into the grooves 91 of said bars. The outer edges of the flanges of the side bars of the upper sash 80 have a snug sliding fit in the longitudinal guide grooves of the auxiliary jamb strips 75, 76, while the top edges of the flanges of the top bar engage upwardly into the corresponding grooves of the auxiliary head strip 65 when the sash is fully raised, as shown in Fig. 4. The sash 80 is held in different adjusted positions by a pair of slide latches 105 (Fig. 2) concealed within the hollow of its bottom bar 83, each such latch having a slot, as instanced in Fig. 14, for guidance to longitudinal movement by studs 106 anchored in said bar and being selectively engageable into cut out notches 107 at different elevations in the corresponding auxiliary jamb strip 75 or 76. Moreover, each latch 105 is yieldingly urged outwardly by a spring 108, and has a lateral finger projection 109 at its rear end by which it can be retracted when the sash is to be released.

The lower main sash 81 is identical in construction with the upper sash except in that its top bar 110 is formed at the outer side with a downwardly open trough projection 111, and its bottom bar 112 with an inwardly extending flange 113 which serves as a finger grasp for convenience in raising the sash. The flange edges of the side bars, 114 and 115 of the lower sash 81 extend, with a sliding fit, into the longitudinal grooves of the auxiliary jamb strips 77, 78 as shown in Figs. 5 and 6, for guidance of the sash in its up and down movement. A weathering strip 116 embracing the L projection 111 on the top bar 110 of the lower sash 81, provides a spring tongue 117 to seal weather-tight with the upstanding flange of the L projection 92 on the bottom rail 83 of the upper sash 80 as shown in Fig. 4. Secured by screws to the top bar 110 of the lower prime sash 81 adjacent its top corners, are angle lugs 118 with which elongate eyes 119 extending laterally inward from the terminal ends of hanger tapes 120 are releasably engaged. The tapes 120 are of tempered spring metal pre-set so as to be self coiling for capacity to balance the weight of the lower sash 81 and hold it in any position to which it may be adjusted, the coils 121 of said tapes being confined in casings 122 secured in the tops of the channels of the jamb rails 3, 4 of the main frame 1 as shown in Figs. 1, 2, 4, 7 and 8.

Secured by a screw 123 within the channel of the jamb rail 3 of main frame 1 (Figs. 1, 2 and 5) is an outwardly-bowed spring tongue 124, the function of which will be explained later herein.

In order that the sashes 80, 81 may be locked against operation, I have provided a slide bolt 125, see Figs. 2, 5, 15 and 16, which as best shown in the latter two of these illustrations, is fashioned to hair pin configuration from stout strip metal, the same being located at the upper left hand corner of the lower sash 81 and being operable from within doors. The long extremity of the bolt 125 overlies the top edge of the sash 81 crosswise, and its short extremity passes through aligned guide slots 126 in the side flanges of the top bar of said sash. The bolt 125 is maintained in assembly by a stop screw 127 whereof the shank extends transversely between the extremities of the hair pin formation, and which, by cooperation with the side flanges of the bar, limits the movement of said bolt. The side flanges of the bar, limit the movement of said bolt. The side frame bar of the upper sash 80 has an aperture 128 to receive the distal end of the long extremity of the bolt 125 when the latter is shifted forwardly as in Fig. 16. Retraction of the bolt 125 is facilitated through formation, at its rear or bow end, of an enlarged grasp loop 129.

For the purposes of winter and summer protection, I have devised further innovations including a supplemental frame 130 for the description of which reference will be had more particularly to Figs. 1 and 4–11. The upper horizontal rail 131 of supplemental frame 130 is substantially channel shaped cross section with its outer and inner flanges 132 and 133 connected by a transverse web 134, the inner flange and the transverse web being extended upwardly and rearwardly respectively as at 135 and 136 as shown in Fig. 4. The side rails 137, 138 of the frame 130 have cross sections identical with that of the head rail 131 in Fig. 4 and meet with the latter in miter abutment at the top of the window as best seen in Figs. 1 and 9–11. The lower horizontal rail 140 of frame 130 is likewise of U cross sectional configuration but has its transverse web 141 extended outwardly and formed with a pair of spaced rounded upstanding beads 142, 143. At the bottom of the window, the side rails 137, 138 of frame 130 are engaged downwardly over the opposite ends of the lower horizontal rail 140 and are there secured by screw bolts 144, see Figs. 1 and 9–11. The supplemental frame 130 is assembled in the structure by engagement of the outward projecting flanges 135 on its head and side rails into the grooves 8 in the lintel and jamb rails with interposition of thermal insulation as at 135a in Figs. 4–6. Lodged with a snap fit in the channel hollows of the rails 131, 137 and 138 are auxiliary strips 145 and 146, 147, 148 and 149 respectively which, except for being slightly narrower, are identical with the corresponding auxiliary strips associated with main frame 1, and which furthermore, are similarly proportioned as to length and correspondingly arranged as best shown in Figs. 7 and 8.

The upper and lower storm sashes designated 150 and 151 respectively, except for being thinner, are in turn generally like the corresponding prime sashes 80 and 81, with their opposite side edges guided in the longitudinal recesses of the auxiliary inset jamb strips 146, 147 and 148, 149, respectively. The bottom rail of the lower storm sash 151 engages over the bead 143 on the bottom rail 141 of supplemental frame 130 when in closed position, as shown in Fig. 4. The inner surfaces of the L flanges 152, 153 respectively on the bottom bar of the upper storm sash 150 and the top bar of the lower storm sash 151 are complementally beveled to form a tight weather seal when said sashes are in closed position, also as shown in Figs. 4 and 5. In both the upper and lower storm sashes, 150, 151, the component frame bars meet in miter joints at corners, and are there connected by corner pieces 154 (whereof one is separately illustrated in Fig. 22), having apertures 155 at intervals longitudinally of their legs which are of right angle cross section. The angle connectors 154 are placed, as instanced in Fig. 21, with their legs engaged in the outer hollows of the contiguous sash frame rails, and are secured, for permanency of the assemblage, by punch-spotting the metal of the inner side flanges of the frame rails into the indentations in said connectors after the manner shown at 155 in Figs. 13 and 21, so that here again, the necessity for the employment of separate securing means is altogether dispensed with.

The upper storm sash 150 is provided, within the channel hollow of its bottom bar, with spring-biased retractable sliding latch bolts 156 which are similar to the latch bolts 105 of the main upper sash 80, and which are adapted to selectively engage into notches 157 at intervals vertically of the auxiliary jamb strips, see Figs. 7, 8 and 12. The lower storm sash 151 is likewise provided on its bottom rail with a pair of slide latch bolts 158, see Figs. 3 and 13, for selective engagement into notches 159 at different levels in the auxiliary jamb strips of the supplemental frame 130 as shown in Figs. 7 and 8. Each latch bolt 158 is urged outward by a compression spring 160, and is operable by means of a finger knob 161 whereof the shank extends outward through a clearance slot 162 in the inner flange of the bar, the distal end portion of said bolt being sustained against dropping by a pin 163 extending crosswise between the side flanges of said bar.

Engaged with a friction fit over the outer flanges of the head and side rails of supplemental frame 130 are strips 164, 165, 166 and 167 which are fashioned from sheet metal, the cross section of said strips being such as to provide aligning grooves 168, 169 and 170 for reception of the inner flanges of the top rail 171 and side rails 172 and 173 of a slidable screen sash 175. The strips 165, 166 are respectively made in two end-abutting sections each substantially of half window height, see Figs. 1, 7, 9, 10 and 11. Like the bars of the glazed sashes, the bars 176, 177, 178 and 179 of the screen sash 175 are of extruded metal and have an irregular channelled cross section. The edge margins of the screen mesh 180 are lodged in longitudinal recess 181 of the bars of the sash 175 and are secured by means of inserted wedge rods 182. When the sash 175 is in down position, its bottom bar 179 engages over the bead 142 of the lower rail 140 of supplemental frame 130, and when in raised position, the inner flange 171 of its top bar 176 engages into the groove 168 of the strip 164. The clearance interval between the bottom bar of the upper storm sash 150 and the top bar 176 of the screen sash 175 is closed by a spring strip 183 of sheet metal. The strip 183 is fashioned to Y cross section and fits over the inner flange of said top bar 176 with the edge of the concaved portion 184 engaging under a lip internally of the top edge of the outer flange of said bar. As shown, the tail flange 185 of the strip 183 is bowed for maintenance normally in yielding contact with the bottom bar of the upper storm sash 150. Raising and lowering of the screen sash 175 is facilitated through provision, on its bottom bar, of a pair of bail-like hand grasps 186.

The prime lower sash 81 can be removed from within doors for cleaning or inspection by first detaching the hanger strips 119, then raising it to full open position, then shifting it rightward to the position A indicated in dash and dot lines, in opposition to the spring tongue 124 in Fig. 2, this latter step being allowed due to the void or clearspace S′ (Fig. 8) in the upper portion of the channel in the jamb rail 4 of the main frame 1 above the strip 78. The sash 81 is then swung inwardly of the window to the position B in Fig. 5 and finally withdrawn from the frame 1. The upper main sash 80 can be removed by first fully lowering it, then shifting it leftward to the dash and dot position C in Fig. 2, this being possible due to the void or clearspace S′ (Fig. 8) in the lower portion of the jamb rail of the main frame 1, then swinging it inwardly, and finally withdrawing it from frame 1. A similar procedure is followed to remove the storm sashes 150 and 151 after the prime sashes 80 and 81 have been withdrawn, i. e. the lower storm sash 151 being first raised to full open position and shifted rightward to the dash and dot line position D in Fig. 3 and the upper sash 150 being lowered and shifted leftward to the dash and dot line position E in Fig. 3.

The screen sash 175 can be withdrawn by first raising it as shown in Figs. 9 and 10, then removing the lower section 166 of the guide strip, then lowering it and removing the upper section 165 of said strip as shown in Fig. 11.

The trim frames 30 and 31 are used for installation of the window in frame buildings. As shown in Fig. 4, the vertical flange 33 of the top rail 32 of the exterior trim frame 30 is abutted against building paper 190 overlying the sheathing 191 and secured by means of nails 192, whereupon shingles or siding 193 are applied thereover, with the projecting flange 40 of said member overhanging the window. The side rails 41 and 42 (Figs. 5 and 6) of the outer trim frame 30 are similarly applied and secured to the sheathing 191 by means of nails 192, and are overlapped by the shingles or siding 193. At the interior, the building, the wall is finished with plaster, as at 199 in Figs. 4, 5 and 6 applied over metallic lathing 200, the plaster being smoothed out to a plane somewhat short of the flanges 56 of the component rails of trim frame 31.

For installation of the window into a wall of masonry, the components of the trim frames 30 and 31 are given the cross sections illustrated in Figs. 26 and 27. As shown, in Fig. 26, the flanges 33a and 40a of the top rail 32a of the outer trim frame 30 are quite short, with the latter flange at right angles to the upstanding flange 33a and the two abutted against the corner of the angle beam 201 extending crosswise of the top of the window opening. The angles 201, 202 representing standard lintels used in building construction are anchored in the wall, with the aid of mortar conventionally indicated at 203, between the bricks or stones 205, 206. The cross section of the top rail 52a of the inner trim frame is identical with that of the top rail 32a of the outer trim frame. This is also true of the side members, of both the inner and outer trim frames, whereof two are shown respectively at 41a and 60a in Fig. 27. The main frame 1 is, in this instance, firmly secured in the wall by means of angle pieces such as the one designated 207 in Fig. 27 having a shank 208 lodged between superposed bricks 209 of the masonry, and upwardly directed portions 210 which fit into the central interval between the T flanges 12 of the jamb rails 3 of said frame. The side rails 41a of the outer trim frame are secured by anchorage of their lateral flanges in the mortar 211 between outer and inner bricks 212, 209 of the wall. At the interior of the building, furring strips 213 are applied to the bricks respectively along the top and side edges of the window opening for attachment of metallic lath 214 which is also secured to the inner one of two furring strips 215, 216, beneath the sill plank 217. The lath 214 is extended outwardly of the sides of the window opening as indicated at 218 in Figs. 26 and 27. The wall is finally finished off at the interior with plaster 219, with incidental embedment of the flanges of the top and side members of the inner trim frame. Preferably, metallic ridge strips, such as shown at 220 in Figs. 26 and 27, are used for protection of the plaster at the top and side corner edges of the finished window opening. The downwardly-directed frontal flange 19 of the sill rail 5 of main frame 1 is rested directly upon the sill bricks 221, while the inner end of said sill rail rests upon the wooden sill plank 217 which is supported by furring strips 215, 216 superimposed upon the inner bricks 222 of the wall. For reinforcement of the sill rail 5 in this instance, I have provided angle pieces such as the one shown at 225 whereof the horizontal flange 226 is disposed between the furring strip 215 and sill plank 217 and secured by nails 227. The upright flange 228 of the angle piece 225 is formed at the top with a laterally-bent wing 229 which fits snugly into the hollow between the sill top 18 and the flange 21 of said sill.

As an alternative, the construction shown in Fig. 28 may be resorted to in installing my improved window in walls of masonry. Here the side rails 41, 60 of the exterior and interior trim frames 30 and 31 are exactly like those of the first described embodiment. In this instance, the offset edge portions of the flanges 43 of the rails 30 are embedded in the mortar 230 between the outer and inner bricks or stones 231 and 232 of the wall, the interior finish of the wall being the same as in Figs. 5 and 6.

In all of the illustrated embodiments it will be seen that variations in the wall thicknesses can be compensated for readily through lateral adjustment of the trim frames relative to the main frame, this being made possible by reason of the sliding engagement of the main flanges of the rail components of said trim frames within the forwardly and rearwardly-open grooves in the corresponding components of said main frame. Due to the interposition of the insulation 135a between the supplemental frame 130 and the main frame, thermal transfer between the two is effectively minimized, with consequent prevention of sweating of the prime sashes.

Having thus described my invention, I claim:

1. In a window structure, a sash-carrying frame comprising lintel and jamb rails of extruded metal with aligning outwardly-projecting longitudinally-extending integral angle section flanges in aligning relation providing forwardly-open registering grooves; and a relatively adjustable exterior trim frame with top and side rails also of extruded metal respectively having rearwardly-extending integral flanges slidably engaged in the forwardly-open grooves of the lintel and jamb rails of the frame, and flanges at right angles for anchorage in a wall into which the structure is set.

2. In a window structure, a sash-carrying frame comprising lintel and jamb rails of extruded metal with aligning outwardly-projecting longitudinally-extending integral angle section flanges providing forwardly-open registering grooves, and a sill rail having a pendent frontal flange; a relatively-adjustable exterior trim frame with top, side and bottom rails also of extruded metal, said top and side rails respectively having integral rearwardly-projecting horizontal flanges slidably engaged in the forwardly-open grooves of the lintel and jamb rails of the main frame and integral outwardly-projecting flanges at right angles for anchorage in a wall into which the structure is set, and said bottom rail having integrally formed therewith a forwardly-extending flange, an upwardly-extending flange lapped by the pendent frontal flange of the sill rail of the main frame, and a downwardly-extending flange for anchorage in the wall.

3. In a window structure, a sash-carrying frame comprising lintel and jamb rails of extruded metal with outwardly-projecting longitudinally-extending aligning integral angle section flanges providing rearwardly-open grooves; and a relatively adjustable interior trim frame comprising top and side rails also of extruded metal with forwardly-projecting flanges slidably engaged into the rearwardly-open grooves of the lintel and jamb rails, and outwardly-projecting integral flanges at right angles to lap the interior face of the wall into which the structure is set.

4. In a window structure, a sash-carrying frame comprising lintel and jamb rails of extruded metal with outwardly-projecting angle section longitudinally-extending integral flanges providing rearwardly-open grooves, and a sill rail having an integral pendent flange at the rear with a rearwardly-open longitudinal groove; and a relatively adjustably interior trim frame comprising top, side and bottom rails also of extruded metal with forwardly-projecting integral flanges slidably engaged respectively into the rearwardly open grooves of the lintel, jamb and sill rails of the main frame, and with integral outwardly-projecting flanges at right angles to lap the interior face of the wall into which the structure is set.

5. In a window structure, a sash-carrying frame comprising lintel and jamb rails of extruded metal with outwardly-projecting angle section longitudinally-extending integral flanges providing rearwardly-open grooves, and a sill rail with a pendent integral flange at the rear having a rearwardly-open longitudinal groove; and a relatively-adjustable interior trim frame including top, side and bottom rails also of extruded metal with forwardly-projecting flanges slidably engaged respectively into the rearwardly-open grooves of the lintel jamb and sill rails of the main frame, with integral outwardly-projecting flanges at right angles to lap the interior face of the wall into which the structure is set, the last mentioned flanges having forwardly-projecting marginal portions for embedment in inside finishing plaster on said wall.

6. In a window structure, a sash-carrying frame comprising lintel, jamb and sill rails of extruded metal, said lintel and jamb rails having pairs of outwardly projecting longitudinally-extending angle section flanges provided forwardly and rearwardly-open grooves; a relatively-adjustable exterior trim frame comprising top and side rails also of extruded metal provided respectively with rearwardly-projecting flanges to slidably engage into the forwardly-open grooves of the lintel and jamb rails of the main frame and with integral outwardly-projecting longitudinal flanges at right angles for anchorage in the wall into which the main frame is set; and a relatively-adjustable interior trim frame comprising top and side rails also of extruded metal respectively with integral forwardly-projecting longitudinal flanges to slidably engage in the rearwardly-open grooves of the lintel and side rails of the main frame and with integratl outwardly-projecting longitudinal flanges at right angles to abut the internal face of the wall.

7. In a window structure, a sash-carrying frame comprising lintel and jamb rails of extruded metal with pairs of outwardly-projecting longitudinally-extending integral angle section flanges respectively providing forwardly and rearwardly-open grooves; and a sill rail having an integral pendent flange at the front, and an integral pendent flange at the back with a rearwardly-open groove; a relatively-adjustably exterior trim frame comprising top, side and bototm rails also of extruded metal, said top and side rails being provided respectively with integral rearwardly-projecting longitudinal flanges to slidably engage into the forwardly-open grooves of the lintel and jamb rails of the main frame, and with integral outwardly-projecting longitudinal flanges for anchorage in the wall into which the main frame is set, and said bottom rails having a forwardly-extending integral longitudinal flange lapped by the pendent frontal flange of the sill rails of the main frame and a downwardly-projecting flange for anchorage in the wall; and a relatively-adjustable interior trim frame comprising top, side and bottom rails also of extruded metal respectively with integral forwardly-projecting longitudinal flanges to slidably engage in the rearwardly-open grooves of the lintel jamb and sill rails of the main frame, and with integral longitudinal outwardly-projecting flanges to abut the internal face of the wall, the last mentioned flanges having forwardly-projecting edge portions for embedment in inside finishing plaster on said wall.

8. In a window structure, a main frame having lintel and sill rails, and jamb rails with inwardly-facing channels, guide means in the upper part of the channel in one jamb rail for one edge of an upper sliding sash extending down from the lintel rail to a level somewhat below the mid height of the window and a guide means in the lower part of said channel for one edge of a lower sliding sash extending up from the sill rail to the aforesaid level and laterally-offset relative to the first guide means; similarly arranged upper and lower guide means in the channel of the other jamb rail respectively for the opposite edges for the upper and lower sashes, the upper of the last mentioned guide means extending down from the lintel rail to a level somewhat above the mid height of the window, and the lower of the last mentioned guide means extending up from the sill rail to a level somewhat above the mid height of the window, whereby, upon lowering the upper sash, it can be shifted edgewise in one direction and then swung laterally for removal from the window, and whereby, upon raising the lower sash, it can be shifted edgewise in the opposite direction and then swung laterally for removal from the window.

9. A window structure according to claim 8, further including self-coiling sash-balancing spring metal tapes extending from casings lodged in the channels of the lintel and jamb rails of the frame at the upper corners, with the free ends of said tapes detachably secured to the upper corners of the lower sash.

10. A window structure according to claim 8, further including a similar but narrower supplemental frame connected to the main frame, said supplemental frame having jamb rails likewise with similarly-arranged guide means for similarly-removable upper and lower sliding storm sashes.

11. A window structure according to claim 8, further including a similar but narrower supplemental frame connected to the main frame, said supplemental frame having jamb rails with similarly-arranged guide means respectively for upper and lower sliding storm sashes and, guide means in spaced relation for a sliding screen sash.

12. In a window structure, a main frame having lintel and sill rails, and jamb rails with longitudinal inwardly-facing channels; an auxiliary jamb strip S-shaped in cross section lodged in the upper part of the channel in one jamb rail and extending down from the lintel rail to a level somewhat below the mid height of the window, with a half portion of said strip affording a guideway for one edge of an upper sliding sash; a similar but reversely-positioned strip occupying the lower portion of the channel in said one jamb rail and extending up from the sill rail to said level below the mid height of the window, with a half portion of the strip affording a guideway for the corresponding side edge of a lower sliding sash; similar strip lodged in the upper portion of the channel in the other jamb rail and extending down from the lintel rail to a level somewhat above the mid height of the window, with a half portion of the strip affording a guideway for the opposite side edge of the upper sash; and a correspondingly but-reversely-positioned strip occupying the lower part of the last mentioned channel and extending up from the sill rail to a level somewhat below the mid height of the window, with a half portion of the strip providing a guideway for the opposite side edge of the lower sash whereby, upon lowering the upper sash, it can be first shifted edgewise in one direction and then swung laterally for removal from the window, and whereby upon raising the upper sash, it can be first shifted edgewise in the other direction and then swung laterally for removal from the window.

13. A window structure according to claim 12, wherein the auxiliary strips are fashioned from springy sheet metal to engage snugly into the channels of the jamb rails; wherein the flanges of the jamb rails have longitudinally extending beads on the inner faces; wherein the strips are each provided in one of their flanges with a longitudinal indentation to engage over one of the beads aforesaid; and wherein the terminal edge of the other flange of each insert strip engages behind the other of said beads.

14. A window structure according to claim 12, wherein the half portions of the upper and lower insert strips in the respective jamb channels jointly provide continuous parting ridges between the upper and lower sashes.

15. A window structure according to claim 12, further including a leaf spring disposed within the last mentioned channel above the auxiliary jamb strip in the lower part of said channel and adapted to yieldingly bear against the corresponding side edge of the lower sash.

16. A window structure according to claim 11, wherein the lintel rail of the frame has a channel in registry with the channels of the jamb rails; and an inset strip identical with those in the jamb channels occupying the channel of the lintel rail for engagement by the top edge of the upper sash when the latter is in closed position.

17. A window structure according to claim 11, further including a similar but a narrower supplemental frame connected to the first main frame and having lintel and jamb rails likewise with spaced inwardly directed flanges, and similarly proportioned and arranged S-shaped strips lodged in the channels and providing guidance for similarly removable upper and lower sliding storm sashes.

References Cited in the file of this patent

UNITED STATES PATENTS

| | | |
|---|---|---|
| 675,048 | McFarland et al. | May 28, 1901 |
| 865,453 | Todd | Sept. 10, 1907 |
| 908,858 | Goddard | Jan. 5, 1909 |
| 1,184,582 | Singer | May 23, 1916 |

(Other references on following page)

UNITED STATES PATENTS

| Number | Name | Date |
|---|---|---|
| 1,599,286 | Renton | Sept. 7, 1926 |
| 1,703,479 | Cronmiller | Feb. 26, 1929 |
| 1,963,839 | Edwards | June 19, 1934 |
| 2,066,051 | Pettit | Dec. 29, 1936 |
| 2,084,776 | Peremi et al. | June 22, 1937 |
| 2,189,960 | Montgomery et al. | Feb. 13, 1940 |
| 2,219,593 | Lang | Oct. 29, 1940 |
| 2,262,670 | Ensminger | Nov. 11, 1941 |
| 2,295,689 | Renton | Sept. 15, 1942 |
| 2,304,063 | Peremi | Dec. 8, 1942 |
| 2,314,970 | Coleman | Mar. 30, 1943 |
| 2,336,922 | Bowdron | Dec. 14, 1943 |
| 2,421,309 | Anderson | May 27, 1947 |
| 2,555,710 | Simpkins et al. | June 5, 1951 |
| 2,585,471 | Kammerer | Feb. 12, 1952 |
| 2,589,685 | Edwards | Mar. 18, 1952 |
| 2,600,283 | Sylvan | June 10, 1952 |
| 2,611,156 | Toth | Sept. 23, 1952 |
| 2,611,934 | Milone | Sept. 30, 1952 |